(12) United States Patent
Tisch

(10) Patent No.: US 7,261,324 B2
(45) Date of Patent: Aug. 28, 2007

(54) CONTAINMENT APPARATUS AND METHOD FOR ATTACHMENT TO A RUPTURED PIPE

(76) Inventor: David M. Tisch, 18921 Villages Scenic Pkwy., Anchorage, AK (US) 99516

( * ) Notice: Subject to any disclaimer, the term of this patent is extended or adjusted under 35 U.S.C. 154(b) by 126 days.

(21) Appl. No.: 11/097,472

(22) Filed: Apr. 1, 2005

(65) Prior Publication Data
US 2006/0220375 A1  Oct. 5, 2006

(51) Int. Cl.
*F16L 55/16* (2006.01)
(52) U.S. Cl. .......................... 285/15; 285/53; 285/373; 138/99
(58) Field of Classification Search .................. 285/15, 285/419, 417, 53, 373; 138/99
See application file for complete search history.

(56) References Cited

U.S. PATENT DOCUMENTS

| | | | | |
|---|---|---|---|---|
| 518,805 A | * | 4/1894 | Cooper | 138/99 |
| 549,594 A | * | 11/1895 | Cooper et al. | 138/99 |
| 962,566 A | * | 6/1910 | Gerth | 138/99 |
| 1,343,463 A | * | 6/1920 | Meredith | 138/99 |
| 1,649,752 A | * | 11/1927 | Stone | 138/99 |
| 4,573,715 A | * | 3/1986 | Armbruster | 285/419 |

* cited by examiner

*Primary Examiner*—David Bochna
(74) *Attorney, Agent, or Firm*—Christensen O'Connor Johnson Kindness PLLC

(57) ABSTRACT

In one embodiment, a containment apparatus includes an outer casing having a body with a first end and a second end sized to fit around a pipe, and an interior channel in the body that extends between the first and second ends configured to receive a section of the pipe. The length of the interior channel is sufficient to enclose a rupture in the pipe between the first and second ends of the body. One or more seals between the first and second ends of the body are configured to seal the outer casing around a rupture in a pipe when a pipe is received in the interior channel. The containment apparatus further includes a securing mechanism that maintains the one or more seals against a pipe when the containment apparatus is attached to a pipe.

18 Claims, 5 Drawing Sheets

US 7,261,324 B2

CONTAINMENT APPARATUS AND METHOD FOR ATTACHMENT TO A RUPTURED PIPE

FIELD OF THE INVENTION

The present invention is directed to methods and apparatus for containing fluid flow from a rupture in a pipe.

BACKGROUND OF THE INVENTION

In many areas of the world, including the United States and Canada, the temperatures in winter can be extreme. Occasionally, water pipes in residences and businesses will freeze, resulting in a rupture in the water pipes. Fluid water in the pipes, under pressure, will flow from the rupture until the water supply is shut off and the ruptured pipes are repaired.

Other severe weather patterns may also cause ruptured pipes to occur. For example, water pipes can be damaged by hurricanes and tornadoes, resulting in unwanted water flow from the damaged pipes until the water supply is shut off and the damaged pipes are repaired. Other events such as earthquakes and terrorist attacks can also cause damage to water lines and water pipes.

Whatever the cause of damage to pipes, unwanted fluid flow from a rupture in a pipe can cause significant damage to the surrounding area. In many emergency situations that involve multi-family dwellings, hotels, or areas of public assembly, the water supply to the entire facility or structure may have to be shut off to control the fluid flow until the damaged pipe can be located and repaired. Not only is this an inconvenience to persons living in the dwellings or using the facilities, the lack of water for drinking and sanitation can result in health problems. Moreover, if a central water supply is shut off to fix a frozen pipe, other pipes in different areas of the structure may be susceptible to freezing due to static water in the pipes. What is needed is an apparatus that can contain fluid flow from a ruptured pipe in a quick and efficient manner while allowing fluid to continue flowing in the pipe.

BRIEF SUMMARY

One exemplary embodiment described herein provides a containment apparatus comprised of two halves that may be hingedly connected to each other. When the two halves of the containment apparatus are fitted around a ruptured pipe, a securing mechanism, such as locking snap tabs, secures the two halves together and maintains one or more seals in the containment apparatus against the ruptured pipe. Generally, the interior diameter of the containment apparatus is close to the exterior diameter of the pipe, thus enhancing the seal of the containment apparatus against the ruptured pipe. A foam material, such as a closed cell neoprene material, may line the interior of the containment apparatus and assist in sealing fluid flow from a ruptured pipe around which the containment apparatus has been placed. Such elements of this embodiment of the invention, as well as other embodiments of the invention, are described in greater detail herein.

BRIEF DESCRIPTION OF THE DRAWINGS

The foregoing aspects and many of the attendant advantages of the invention will become more readily appreciated as they become better understood by reference to the following detailed description, when taken in conjunction with the accompanying drawings, wherein.

DETAILED DESCRIPTION

Embodiments of the present invention provide a unique containment apparatus that can be used in the event of a rupture of a pipe in which fluid flows. Although the illustrated embodiments are principally discussed herein as being used with water pipes, embodiments of the invention can also be used to contain fluid flow from pipes that carry other types of fluids, such as oil, gas, steam, etc. Though embodiments of the invention are intended to provide a secure containment of a ruptured pipe, it is generally anticipated that the containment apparatus will be used only in emergency situations for a temporary period of time. The containment apparatus is generally not intended to replace any form of permanent repairs that may be required to remain compliant with government building codes.

Using an example of a ruptured water pipe, a containment apparatus constructed according to the invention can be used to minimize or stop the unwanted flow of water escaping from the rupture in the water pipe. This reduces the amount of water damage to adjacent areas and helps maintain an uninterrupted supply of water to persons and devices depending on the water supply. Generally speaking, it is expected that the containment apparatus will allow water to continue flowing through the damaged water pipe until service technicians have adequate time to assess the damage and seal off limited sections of the water pipe for repair.

Figure 1:
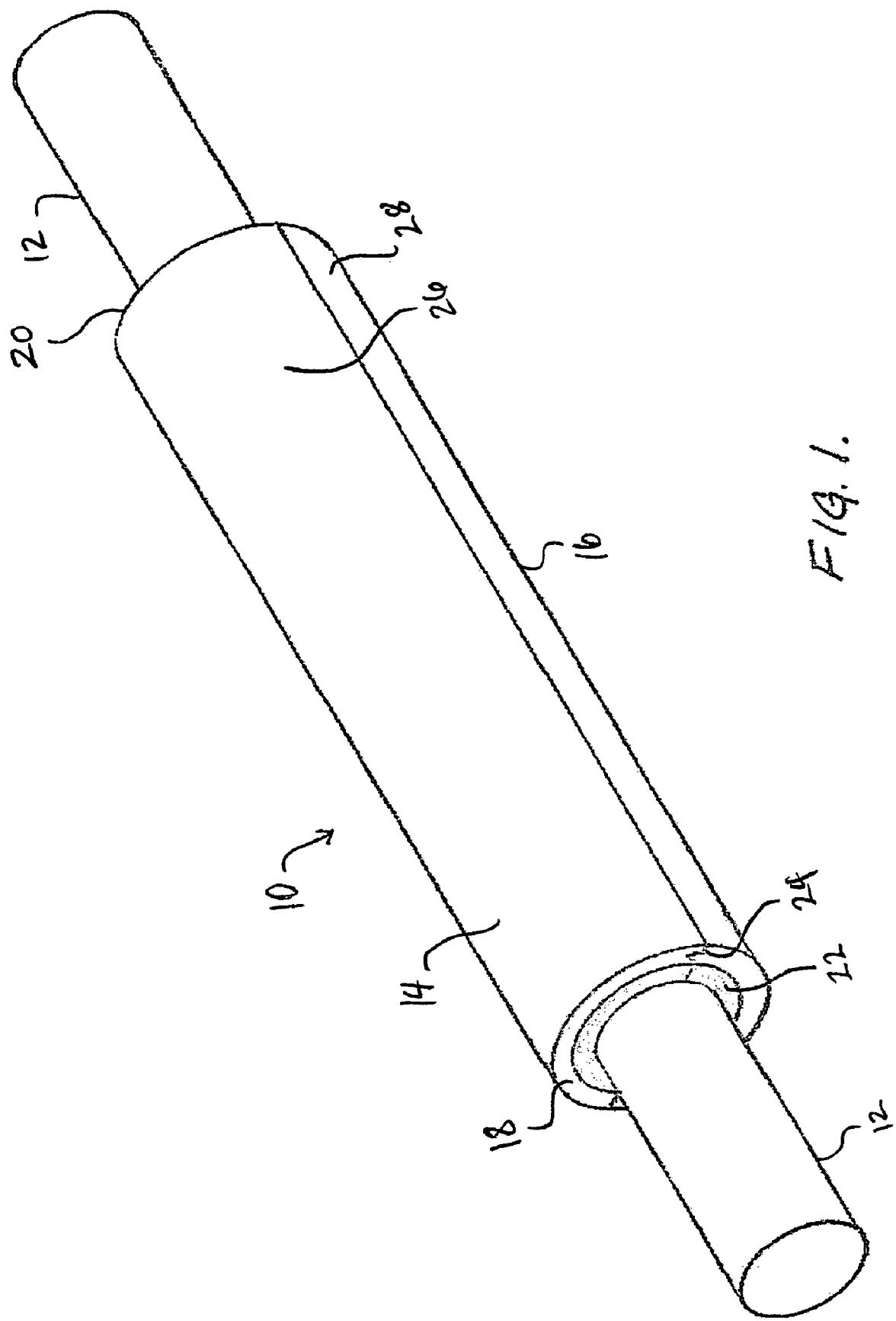
FIG. 1 is a perspective view of a containment apparatus constructed in accordance with one embodiment of the present invention attached to a pipe.

FIG. 1 depicts an embodiment of a containment apparatus 10 that is configured for attachment to a ruptured pipe 12. In this embodiment, the containment apparatus 10 includes an outer casing 14 having a body 16 with a first end 18 and a second end 20. The first end 18 and second end 20 are sized to fit around the pipe 12 when the containment apparatus 10 is attached to the pipe 12.

As will be explained in greater detail below, the containment apparatus 10 further includes one or more seals 22 between the first and second ends 18, 20. The one or more seals 22 are configured to seal the outer casing 14 around a rupture in a pipe 12 when the pipe 12 is received into the containment apparatus 10. To maintain the one or more seals 22 against the pipe 12, the containment apparatus 10 further includes a securing mechanism 24 that secures the containment apparatus around the pipe 12.

The outer casing 14 may be constructed of a hard material, such as plastic, that has an adequate burst strength to accommodate the maximum fluid pressure flowing from a rupture contained within the containment apparatus 10. For example, if the containment apparatus 10 is intended for household water pipes, the outer casing 14 of the containment apparatus may be constructed of material having an adequate burst strength that accommodates the maximum household water pressure in the water pipes.

The containment apparatus 10 may be sized for use with any type of pipe, metric or American, in any application. In the example of a household system, the pipe 12 shown in FIG. 1 represents a standard construction grade ½" copper water pipe that is typically used in residential and business plumbing applications.

The containment apparatus 10 shown in FIG. 1 is shown having a configuration in which the body 16 of the outer casing 14 is divided into two halves 26 and 28. The two halves 26, 28 facilitate the placement of the containment apparatus 10 around the pipe 12. In this embodiment, the securing mechanism 24 is designed to secure the two halves together when the containment apparatus 10 is attached to the pipe 12. The securing mechanism 24 may assume any form as appreciated and desired by persons having ordinary skill in the art. In one embodiment, the securing mechanism 24 is formed using a locking snap tab. The snap tabs may be defined along the longitudinal length of the outer casing 14.

Figure 2:
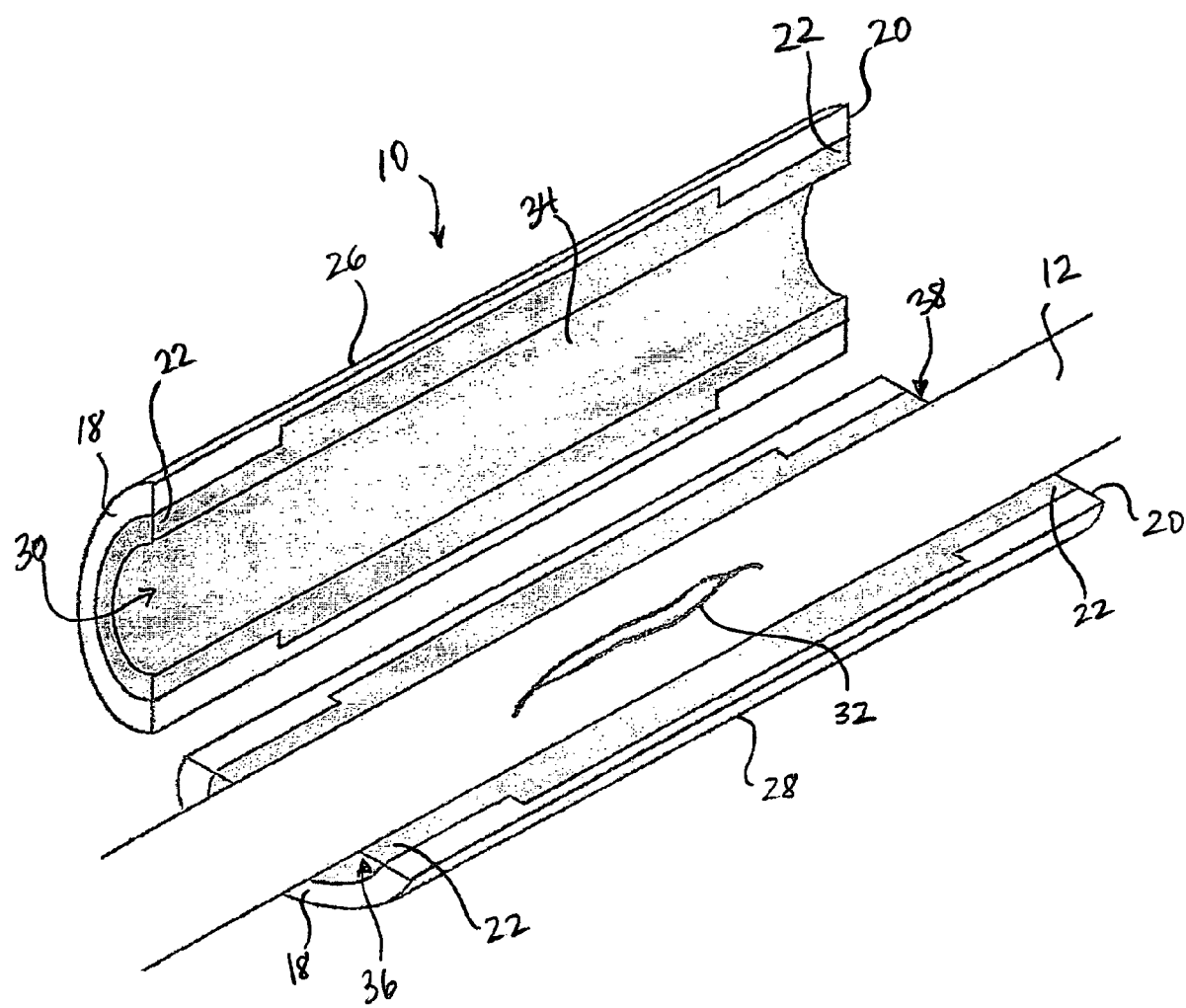
FIG. 2 is a perspective view of a containment apparatus as shown in FIG. 1 in an open position showing a rupture in a pipe received into the containment apparatus.

FIG. 2 illustrates the embodiment shown in FIG. 1 in which the two halves 26, 28 of the body 16 are shown in an open position. The two halves 26, 28 provide an interior channel 30 that extends between the first end 18 and the second end 20. The interior channel 30 is configured to receive a section of a pipe 12. The length of the interior channel 30 is sufficient to enclose a rupture 32 in the pipe 12 between the first end 18 and the second end 20 of the body 16.

In the embodiment shown in FIG. 2, the interior channel 30 is lined with a foam material 34. While any type of foam material can be used to line the interior channel 30, an embodiment of the invention under current consideration uses a closed cell neoprene material.

The material 34 that lines the interior channel 30 may be malleable so that it can accommodate an irregular shape in the pipe 12, such as formed by the rupture 32 in the pipe 12. As previously noted herein, a frozen water pipe may force an outward rupture in the pipe 12. The material 34 can adapt to the shape of the rupture 32 and help seal against fluid flow from the rupture 32.

Furthermore, in this particular embodiment, the one or more seals 22 are formed integrally with the material 34 that lines the interior channel 30. In circumstances where a closed cell neoprene material is used to line the interior channel 30, the one or more seals 22 are also formed of the neoprene material. Other embodiments of the invention may employ one or more seals 22 that are separate from a material 34 that lines the interior channel 30. In such embodiments, the one or more seals 22 can be formed of any material, including a foam material that may be used in the interior channel 30.

While the illustrated embodiment shows an interior channel 30 that is cylindrical, the shape of the interior channel 30 may be configured as desired. A cylindrical interior channel is typically preferred because the pipes 12 received into the interior channel 30 are typically cylindrical in shape.

Also as illustrated in FIGS. 1 and 2, the first and second ends 18, 20 may be configured with apertures 36 and 38 that allow a pipe 12 received in the interior channel 30 to extend outward from the first and second ends 18, 20. The diameter of the apertures 36, 38 may be sized in accordance with a diameter of a pipe 12 that is expected to be received in the interior channel 30.

Figure 3:
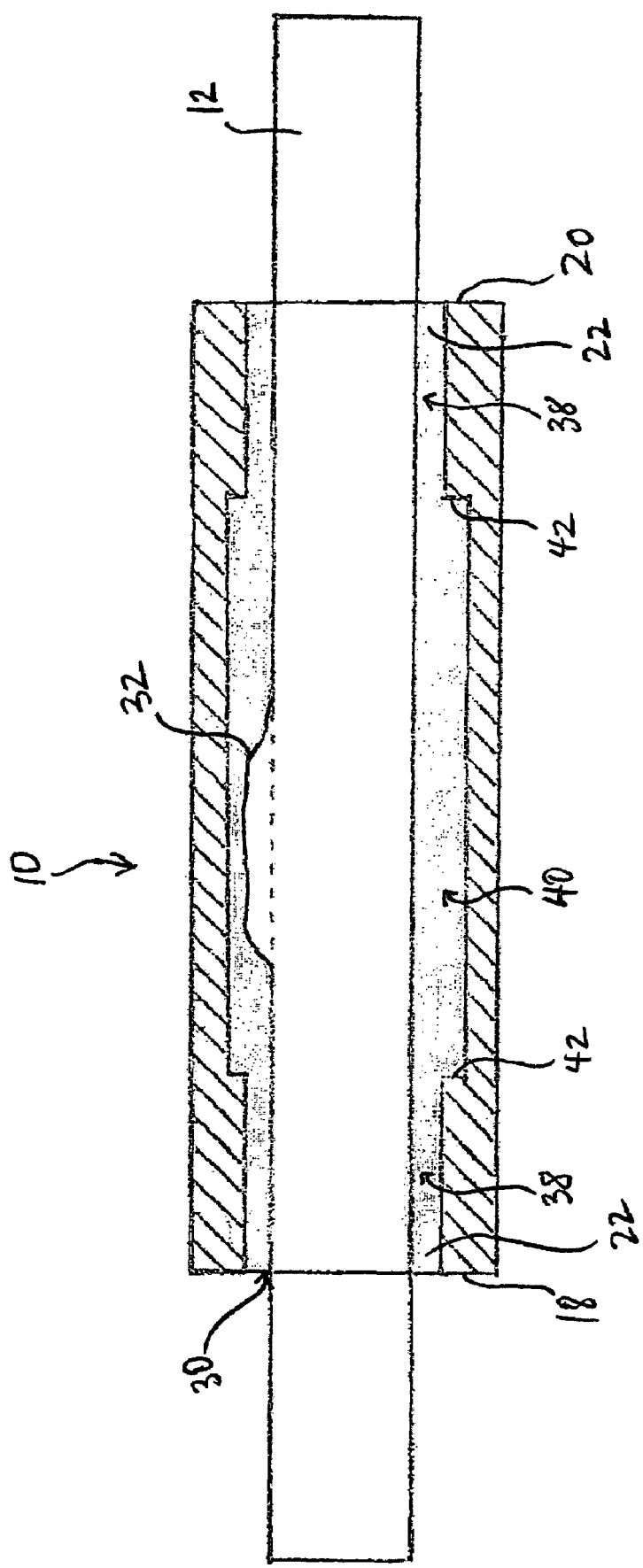
FIG. 3 is a section view of the containment apparatus shown in FIGS. 1 and 2.

FIG. 3 provides a section view of the containment apparatus 10 shown in FIGS. 1 and 2. As previously described, the containment apparatus 10 is configured for attachment to a ruptured pipe. In this instance, FIG. 3 illustrates the containment apparatus 10 around a pipe 12 that includes an outward rupture 32. The material 34 lining the interior channel 30 accommodates the expanded irregular shape of the rupture 32.

The interior channel 30 may be configured with different portions having a different diameter. In the illustrated embodiment, outer portions 38 are configured with a smaller diameter than an inner portion 40. The transition between the portions 38, 40 may be shaped as desired. In the illustrated embodiment, an interior shoulder 42 separates the expanded inner portion 40 from the narrower outer portions 38.

In view of the narrower diameter of the outer portions 38, the first and second ends 18, 20 may thus form a collar having a diameter that is smaller than a diameter of the inner portion 40 of the interior channel 30. In this embodiment, the one or more seals 22 are disposed at the collar such that the collar presses the seals 22 against a pipe 12 when the containment apparatus 10 is attached to the pipe 12.

Figure 4A:
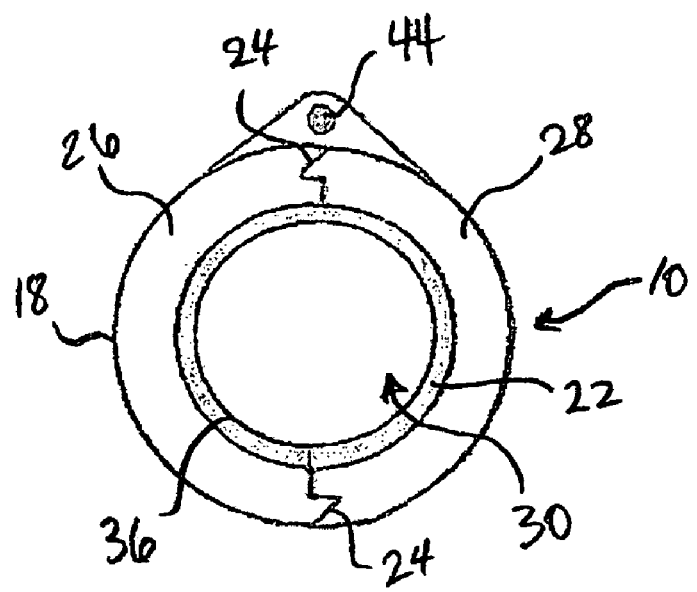
FIG. 4A is an end view of a containment apparatus constructed according to another embodiment of the invention.

While FIG. 2 illustrates one embodiment in which the two halves 26, 28 forming the outer casing 14 are separate from each other, other embodiments of the invention may include two halves 26, 28 that are connected to each other. FIG. 4A illustrates one such embodiment in which the two halves 26, 28 are connected to each other by a hinge. The illustrated embodiment includes a pin 44 about which the two halves 26, 28 can rotate prior to attaching the containment apparatus 10 to a pipe. In other embodiments, the hinge connecting the two halves 26, 28 may be a living hinge formed integrally with the material forming the outer casing 14 of the containment apparatus 10.

FIG. 4A is an end view of the containment apparatus 10 at the first end 18 referred to in FIGS. 1 and 2. When a pipe 12 is received in the interior channel 30, the pipe 12 may extend outward from the first end 18 through the aperture 36 at the first end 18.

FIG. 4A further illustrates a securing mechanism 24 as referenced in FIG. 1. The securing mechanism 24 is used to secure the two halves 26, 28 together around a pipe when the containment apparatus 10 is attached to a pipe. The securing mechanism helps maintain the one or more seals 22 against the pipe. Depending on the diameter of the interior channel 30, the material forming the seals 22 as well as the material 34 lining the interior channel 30 may be compressed against the pipe 12, thus providing a positive, fluid tight seal around a rupture 32 in the pipe 12.

Figure 4B:
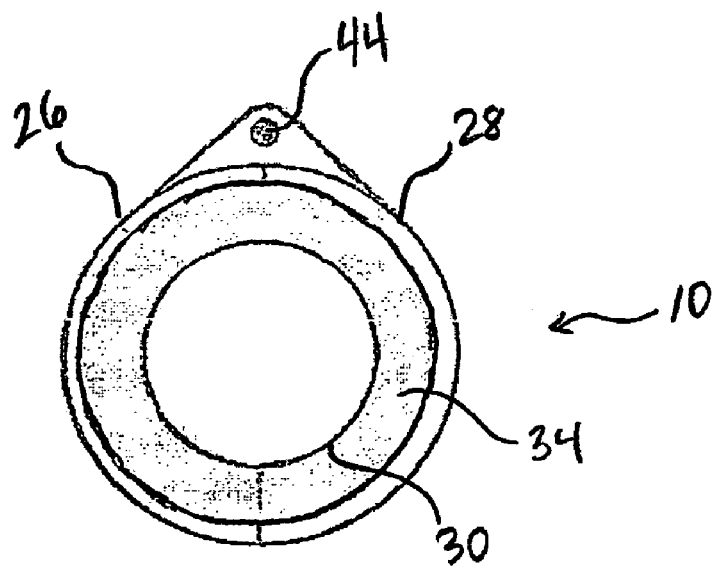
FIG. 4B is a section view showing the interior of the containment apparatus shown in FIG. 4A.

FIG. 4B is a section view of the containment apparatus 10 shown in FIG. 4A. A material 34, such as a closed cell neoprene foam, lines the interior channel 30 to help seal the containment apparatus 10 against a rupture in a pipe received in the interior channel 30.

Figure 5:
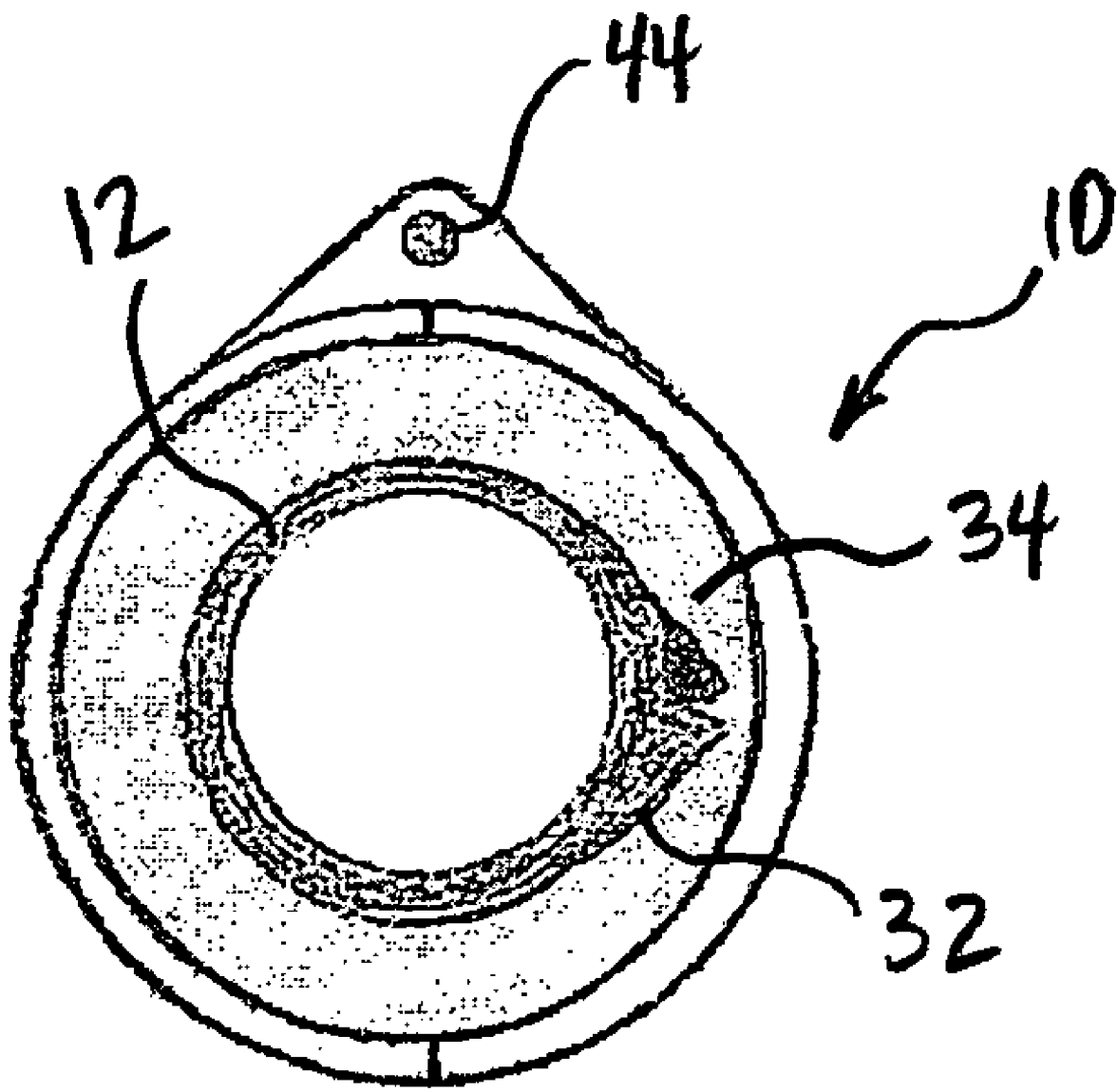
FIG. 5 is a section view of the containment apparatus shown in FIG. 4A attached to a ruptured pipe.

FIG. 5 is a section view as shown in FIG. 4B in which the containment apparatus 10 has been attached to a pipe 12 with a rupture 32. The material 34 lining the interior channel 30 accommodates the rupture 32 and helps seal against fluid flow from the pipe 12 through the rupture 32.

Various embodiments of the present invention have various advantages, one of which is that it can improve safety conditions around damaged pipes and reduce the amount of time spent in emergency situations dealing with ruptured pipes. When fitted around a ruptured pipe, a containment apparatus constructed according to the invention may help save money for municipalities, states, and the federal government (e.g., FEMA) that have to respond to emergency situations. Embodiments of the invention facilitate a temporary fix of ruptured or split water pipes allowing for an uninterrupted flow of fluid, such as water, for drinking and sanitation. Homeowners and businesses, and their insurance providers, will also save money in that the amount of water damage will be greatly reduced as the unwanted flow of water from a ruptured pipe is controlled in a more efficient manner.

Having a rupture in a pipe contained by a containment apparatus of the invention further facilitates a safer working environment for emergency responders who are called upon to mitigate such emergencies. Moreover, keeping water flowing in undamaged pipes in a cold environment can prevent further freezing of pipes that would otherwise occur without the invention when central water supplies are required to be shut off.

While several embodiments of the invention have been illustrated and described, it will be appreciated that various changes can be made therein without departing from the spirit and scope of the invention. The scope of the invention should therefore be determined, not from the precise forms described herein, but from the following claims and equivalents thereto.

The embodiments of the invention in which an exclusive property or privilege is claimed are defined as follows:

1. A containment apparatus configured for attachment to a ruptured pipe, comprising:
    (a) an outer casing having
        (1) a body with a first end and a second end, wherein the first and second ends of the body include a collar sized to fit around a pipe in close fitting relationship to the pipe; and
        (2) an interior channel in the body that extends between the first and second ends configured to receive a section of the pipe,
        wherein the length of the interior channel is sufficient to enclose a rupture in the pipe between the first and second ends of the body, and
        wherein the interior channel is lined with a closed cell foam material that presses firmly against the pipe and adapts to the shape of the rupture without a forming void around the rupture to seal against fluid flow from the rupture when the containment apparatus is attached to the pipe;
    (b) one or more seals at the first and second ends of the body configured to seal the outer casing around a rupture when a ruptured pipe is received in the interior channel, wherein the one or more seals are disposed between the collar and the pipe such that the collar compresses the one or more seals against the pipe to provide positive, fluid tight seals around the rupture; and
    (c) a securing mechanism configured to maintain the containment apparatus with the one or more seals against a pipe when the containment apparatus is attached to the pipe.

2. The containment apparatus of claim 1, wherein the interior channel is cylindrical.

3. The containment apparatus of claim 1, wherein the first and second ends of the body are configured with apertures that allow a pipe received in the interior channel to extend outward from the first and second ends.

4. The containment apparatus of claim 3, wherein the apertures have a diameter sized in accordance with a diameter of a pipe expected to be received in the interior channel.

5. The containment apparatus of claim 1, wherein the foam material is a closed cell neoprene material.

6. The containment apparatus of claim 1, wherein the interior channel is configured with a portion having a wider diameter than another portion of the interior channel.

7. The containment apparatus of claim 1, wherein the one or more seals are formed from a foam material.

8. The containment apparatus of claim 7, wherein the foam material is a closed cell neoprene material.

9. The containment apparatus of claim 1, wherein the one or more seals are formed integrally with a material that lines the interior channel.

10. The containment apparatus of claim 1, wherein the collar has a diameter smaller than a diameter of an inner portion of the interior channel.

11. The containment apparatus of claim 1, wherein the body is divided into two halves that can be secured to each other.

12. The containment apparatus of claim 11, wherein the two halves are connected to each other using a hinge.

13. The containment apparatus of claim 12, wherein the hinge includes a pin about which the two halves can rotate prior to attaching the containment apparatus to a pipe.

14. The containment apparatus of claim 12, wherein the hinge is a living hinge formed integrally with the outer casing.

15. The containment apparatus of claim 11, wherein the securing mechanism is configured to secure the two halves together around a pipe when the containment apparatus is attached to a pipe.

16. The containment apparatus of claim 15, wherein the securing mechanism includes a locking snap tab.

17. The containment apparatus of claim 16, wherein the locking snap tab is defined along a longitudinal length of the outer casing.

18. The containment apparatus of claim 1, wherein the securing mechanism is positioned within the body of the containment apparatus beneath the outer surface of the body.

* * * * *